US010996202B2

(12) United States Patent
Kusumoto et al.

(10) Patent No.: US 10,996,202 B2
(45) Date of Patent: May 4, 2021

(54) ANALYSIS DEVICE, ANALYSIS METHOD, AND RECORDING MEDIUM STORING A PROGRAM FOR DERIVING INFORMATION RELATING TO DEGRADATION OF A PIPE

(71) Applicant: NEC Corporation, Tokyo (JP)

(72) Inventors: Manabu Kusumoto, Tokyo (JP); Katsumi Kikuchi, Tokyo (JP); Takahiro Kumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 266 days.

(21) Appl. No.: 16/098,158

(22) PCT Filed: May 11, 2017

(86) PCT No.: PCT/JP2017/017843
§ 371 (c)(1),
(2) Date: Nov. 1, 2018

(87) PCT Pub. No.: WO2017/199839
PCT Pub. Date: Nov. 23, 2017

(65) Prior Publication Data
US 2019/0154637 A1    May 23, 2019

(30) Foreign Application Priority Data
May 17, 2016    (JP) .............................. JP2016-098441

(51) Int. Cl.
*G01N 29/44*    (2006.01)
*F17D 5/00*    (2006.01)
(Continued)

(52) U.S. Cl.
CPC .......... *G01N 29/4472* (2013.01); *F17D 5/00* (2013.01); *G01F 1/666* (2013.01); *G01N 29/043* (2013.01);
(Continued)

(58) Field of Classification Search
USPC .......................................................... 702/34
See application file for complete search history.

(56) References Cited

U.S. PATENT DOCUMENTS

| 2001/0032064 A1 | 10/2001 | Araki et al. |
| 2004/0243321 A1 | 12/2004 | Pittalwala et al. |
| 2017/0247863 A1* | 8/2017 | Kobayashi ................ E03B 1/02 |

FOREIGN PATENT DOCUMENTS

| CN | 104831776 A | 8/2015 |
| JP | H06-306893 A | 11/1994 |

(Continued)

OTHER PUBLICATIONS

Koichi Fujino, "Water Hammer Analysis by the Algebraic Method and Its Application to Conduits of Pumped Storage Power Plants", Oct. 2001 (277 page total).

(Continued)

*Primary Examiner* — Paul D Lee

(57) ABSTRACT

To acquire information relating to degradation of a pipe on the basis of information that can be acquired using a simple method. The analysis device according to one embodiment is provided with: a determining unit for determining whether or not the accuracy of a pipe network model based on information that includes a parameter that changes in value in accordance with degradation of a pipe satisfies a predetermined criterion; and a derivation unit for deriving information relating to degradation of the pipe, based on the parameter, if the accuracy satisfies the predetermined criterion.

13 Claims, 11 Drawing Sheets

(51) Int. Cl.
*G01F 1/66* (2006.01)
*G01N 29/14* (2006.01)
*G01N 29/46* (2006.01)
*G01N 29/07* (2006.01)
*G01N 29/04* (2006.01)

(52) U.S. Cl.
CPC ............ *G01N 29/07* (2013.01); *G01N 29/14* (2013.01); *G01N 29/46* (2013.01); *G01N 2291/0258* (2013.01); *G01N 2291/02854* (2013.01); *G01N 2291/262* (2013.01); *G01N 2291/2634* (2013.01)

(56) References Cited

FOREIGN PATENT DOCUMENTS

| | | | |
|---|---|---|---|
| JP | H08-178172 A | | 7/1996 |
| JP | 2001-344295 A | | 12/2001 |
| JP | 2002-259458 A | | 9/2002 |
| JP | 2002259458 A | * | 9/2002 |
| JP | 2009-074571 A | | 4/2009 |
| JP | 2010-048058 A | | 3/2010 |
| JP | 2010-230418 A | | 10/2010 |

OTHER PUBLICATIONS

International Search Report for PCT Application No. PCT/JP2017/017843, dated Jul. 11, 2017.
English translation of Written opinion for PCT Application No. PCT/JP2017/017843.

* cited by examiner

ANALYSIS DEVICE, ANALYSIS METHOD, AND RECORDING MEDIUM STORING A PROGRAM FOR DERIVING INFORMATION RELATING TO DEGRADATION OF A PIPE

This application is a National Stage Entry of PCT/JP2017/017843 filed on May 11, 2017, which claims priority from Japanese Patent Application 2016-098441 filed on May 17, 2016, the contents of all of which are incorporated herein by reference, in their entirety.

TECHNICAL FIELD

The present disclosure relates to a technique for analyzing a state of a pipe network in which fluid flows.

BACKGROUND ART

In recent years, a technique capable of appropriately managing a piping network that can transport fluid, such as a gas transportation network and a water and sewage network, and fluid transported by the piping network has been demanded.

PTLs 1 to 3 disclose a technique for acquiring a finding relating to degradation of a piping network or a pipe.

PTL 1 discloses a technique for detecting clog due to deposits in a pipe.

PTL 2 discloses a method in which a device generating an impact wave is attached to a water pipe, an impact wave is generated, a propagation velocity is determined on the basis of an arrival time of the impact wave from upstream to downstream, and degradation is diagnosed from the propagation velocity.

PTL 3 discloses a method for calculating data of a decreased wall thickness of piping, by simulating a behavior of fluid based on three-dimensional disposition data of the piping, data indicating thinning of wall thickness of the piping and data indicating a behavior of the fluid flowing in the piping.

CITATION LIST

Patent Literature

[PTL 1] Japanese Unexamined Patent Application Publication No. 2009-74571
[PTL 2] Japanese Unexamined Patent Application Publication No. 2010-230418
[PTL 3] Japanese Unexamined Patent Application Publication No. 2001-344295

SUMMARY OF INVENTION

Technical Problem

In the method disclosed in PTL 1, a piezoelectric sensor needs to be connected to a pipe. A pipe is commonly located in a place such as underground in which direct access is difficult, and therefore it is not easy for a piezoelectric sensor to be connected to a pipe.

In a method of diagnosing degradation from a propagation velocity of an impact wave as disclosed in PTL 2, a special device for generating an impact wave is needed.

In the technique disclosed in PTL 3, data indicating thinning of piping, data indicating a behavior of fluid flowing in the piping, and the like are used. It is not easy to acquire or accurately measure such data when piping in which direct access is difficult, such as piping embedded in the ground, is a target for the measurement.

In view of the above-described problems, the present invention has been made, and one object of the present invention is to provide a device capable of acquiring information relating to degradation of a pipe on the basis of information that can be acquired by a simple method.

Solution to Problem

An analysis device according to first aspect of the present invention includes determination means for determining whether accuracy of a pipe network model based on information including a parameter changing in value depending on degradation of a pipe satisfies a predetermined condition; and derivation means for deriving information relating to degradation of the pipe based on the parameter when the accuracy satisfies the predetermined condition.

An analysis method according to second aspect of the present invention includes determining whether accuracy of a pipe network model based on information including a parameter changing in value depending on degradation of a pipe satisfies a predetermined condition; and deriving information relating to degradation of the pipe based on the parameter when the accuracy satisfies the predetermined condition.

A program according to third aspect of the present invention causing a computer to execute a determination process of determining whether accuracy of a pipe network model based on information including a parameter changing in value depending on degradation of a pipe satisfies a predetermined condition; and a derivation process of deriving information relating to degradation of the pipe based on the parameter when the accuracy satisfies the predetermined condition.

Advantageous Effects of Invention

According to the present invention, information relating to degradation of a pipe can be acquired on the basis of information that can be acquired by a simple method.

EXAMPLE EMBODIMENT

Hereinafter, example embodiments of the present invention are described in detail with reference to the drawings. A configuration to be described in the following example embodiments is merely illustrative, and the technical scope of the present invention is not limited thereto.

An analysis device to be described in the following respective example embodiments may be realized by dedicated hardware. The analysis device may be configured as a system in which one or more components configuring the analysis device are realized by using one or more physical or logical information processing devices (physical computers, virtual computers, and the like).

In the following description, it is assumed that an analysis target is described as a water pipe network that transports (distributes) water. However, the present invention to be described by using the present example embodiment as an example is not limited thereto and is applicable to a pipe network in which any fluid other than water flows. The any fluid may be, for example, liquid other than water or gas such as natural gas.

First Example Embodiment

<Configuration>

Figure 1:
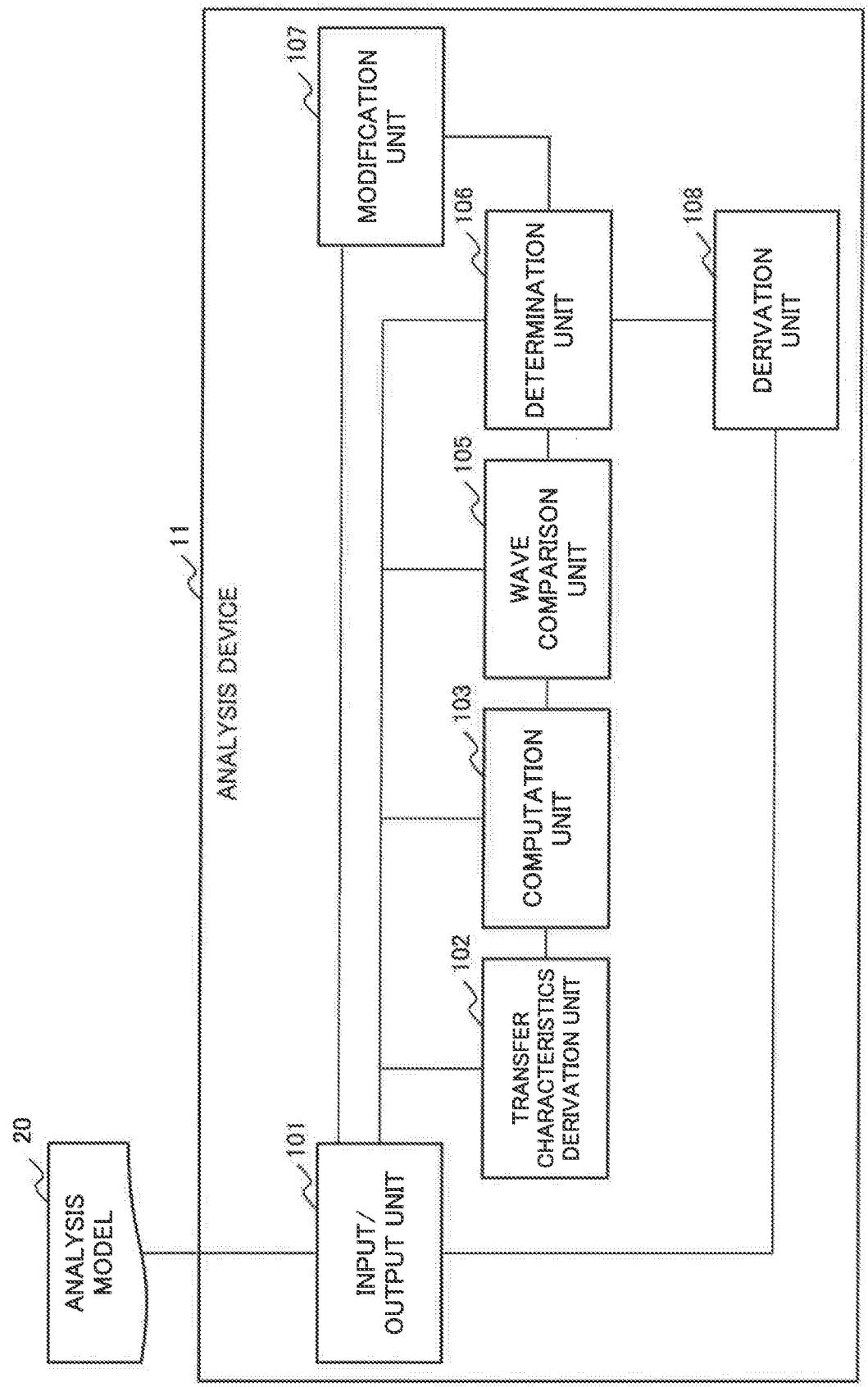
FIG. 1 is a block diagram illustrating a configuration of an analysis device according to a first example embodiment of the present invention.

A first example embodiment of the present invention is described. FIG. 1 is a block diagram illustrating a configuration of an analysis device 11 according to the first example embodiment of the present invention.

The analysis device 11 is configured to be able to refer to an analysis model 20.

The analysis model 20 is information indicating a pipe network. Specifically, the information indicating a pipe network includes information such as a connection relation, a length, a diameter, material quality and roughness of a pipe constituting a pipe network. Information of material quality and roughness of the pipe may be expressed, for example, as a flow coefficient.

The analysis model 20 may be information basically equivalent to information indicating a pipe network. The analysis model 20 may be, for example, information indicating an electrical circuit network in which the pipe network is modeled. The analysis model 20, for example, may be previously prepared by a device that is not illustrated or may be prepared by a user. The analysis model 20 is stored, for example, on a storage device or the like that is not illustrated. The analysis model 20 may be stored on a computer that implements the analysis device 11.

The analysis device 11 includes an input/output unit 101, a transfer characteristics derivation unit 102, a computation unit 103, a wave comparison unit 105, a determination unit 106, a modification unit 107, and a derivation unit 108.

===Input/Output Unit 101===

The input/output unit 101 exchanges data between the analysis device 11 and an information processing device (not illustrated) connected to the analysis device 11. The input/output unit 101 may be connected to a storage medium that stores data. The input/output unit 101 may exchange data by the user of the analysis device 11. The input/output unit 101 may include an interface in which the user can write and browse data. The input/output unit 101 may be connected to an output device that includes a display function.

The input/output unit 101 acquires an analysis model 20, for example, from the storage device that stores the analysis model 20. The input/output unit 101 may acquire a part or the whole of the analysis model 20 from the user via an input/output interface in the input/output unit 101.

The input/output unit 101 also exchanges data with respective components of the analysis device 11.

The input/output unit 101 transmits information necessary for deriving or calculating transfer characteristics (to be described later) to the transfer characteristics derivation unit 102.

The input/output unit 101 transmits, for example, information of a pipe network to be analyzed by the analysis device 11 to the transfer characteristics derivation unit 102. The pipe network to be analyzed is, for example, a part of the pipe network represented by the analysis model 20. The input/output unit 101 transmits, for example, information of a partial range of the analysis model 20 to the transfer characteristics derivation unit 102 as information of the pipe network to be analyzed. The information of the pipe network to be analyzed includes designation of a point that defines a range to be analyzed (i.e. end points in the range in a pipe network). Hereinafter, a point that defines a range to be analyzed is expressed as an "end point". The input/output unit 101 transmits designation of an interior point existing in the range in a pipe network to be analyzed to the transfer characteristics derivation unit 102.

The input/output unit 101 may acquire information of the pipe network and designation of the range to be analyzed and the interior point, for example, by input, made by the user, capable of referring to the analysis model 20. Alternatively, the input/output unit 101 may acquire the above-described information and the above-described designation by reading data stored on a storage device that is not illustrated.

Figure 2:
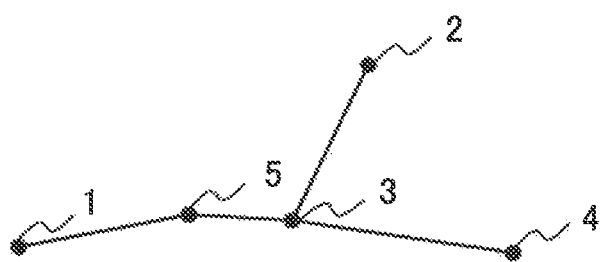
FIG. 2 is a conceptual diagram illustrating an example of a pipe network to be analyzed by the analysis device according to the first example embodiment.

FIG. 2 is a diagram conceptually illustrating the pipe network of the range to be analyzed. In the pipe network, points 1, 2, and 4 are the end points, and a point 5 is the interior point. A point 3 is a branch point and is not directly involved in various operations in the present description. Hereinafter, in description of the present example embodiment, it is assumed that the pipe network illustrated in FIG. 2 is analyzed as a target.

The input/output unit 101 transmits structure information of the pipe network to be analyzed to the transfer characteristics derivation unit 102. Structure information of the pipe network is used in derivation of transfer characteristics executed by the transfer characteristics derivation unit 102. The structure information of the pipe network is, for example, a connection relation, a length, an external diameter, and a flow coefficient of a pipe constituting the pipe network. The input/output unit 101 may extract structure information of the pipe network from the analysis model 20 and transmit the extracted information to the transfer characteristics derivation unit 102.

Information necessary for deriving or calculating transfer characteristics includes information of a parameter or parameters that change according to degradation of pipes constituting the pipe network.

The degradation of a pipe is, for example, a change of a wall thickness of the pipe. The wall thickness of the pipe is a thickness of a member constituting the pipe. In other words, the wall thickness of the pipe is a difference between an external diameter and an internal diameter of the pipe. Thinning of the wall thickness of the pipe is particularly referred to as thinning. Thinning is caused by friction and the like due to fluid flowing.

Therefore, a parameter that changes according to degradation of the pipe is, for example, a parameter that changes depending on the wall thickness of the pipe.

The parameter that changes depending on the wall thickness of the pipe is, for example, a velocity of sound (hereinafter, a "sound velocity") transferred in fluid (water in the present example embodiment) flowing in the pipe. The sound velocity is, in other words, a propagation velocity of a pressure wave in fluid flowing in the pipe. When the sound velocity is designated as "c", "c" is represented, for example, as the following equation (1).

[Math. 1]

$$c = \frac{1}{\sqrt{\rho\left(\frac{1}{E_W} + \frac{D}{t}\frac{(1-\lambda)}{E_S}\right)}} \quad (1)$$

Note that "ρ" is a density of water, "$E_W$" is a volume elasticity modulus (2.14 GN/m² at 15° C.) of water, D is an internal diameter of the pipe, "t" is a wall thickness of the pipe, "$E_s$" is an elastic coefficient of the pipe, and "k" is a ratio in which an element (soil and the like) other than the pipe shares an internal pressure of the pipe. Note that equation (1) is described, for example, in page 25 of the following document <1>.

Document <1>: Koichi Fujino, "WATER HAMMER ANALYSIS BY THE ALGEBRAIC METHOD AND ITS APPLICATION TO CONDUITS OF BUMPED STORAGE POWER PLANTS", [online], October 2001, [retrieved on May 16, 2016], the Internet <URL: http://www.edit.ne.jp/~fkoichi/dron/ronbunkonbun.pdf>

As the wall thickness of the pipe is thinned, a value of D/t is increased, and therefore according to equation (1), as the wall thickness of the pipe is thinned, a value of a sound velocity is decreased.

Therefore, the input/output unit 101 may transmit the value of the sound velocity as information of a parameter that changes according to degradation of the pipe to the transfer characteristics derivation unit 102. Note that, when a plurality of types of pipes are included in the pipe network to be analyzed, the input/output unit 101 may determine an initial value of the sound velocity for a pipe of each type.

The input/output unit 101 may transmit any value as an initial value of the parameter (the sound velocity in the present example embodiment) to the transfer characteristics derivation unit 102. Note that, in general, it is known that a sound velocity in liquid has a value in a range approximately from 1000 to 1500 m/s. The input/output unit 101 may transmit, for example, a value of 1200 m/s as a value of the parameter. Alternatively, the input/output unit 101 may acquire the value of the parameter from the analysis model 20 or by input of the user. At that time, the acquired value does not need to be accurate since being able to be modified by the modulation unit 107 to be described later.

A parameter that changes according to degradation of a pipe may not be necessarily a sound velocity itself. A parameter that changes according to degradation of a pipe may be, for example, a parameter basically equivalent to the sound velocity such as the parameter of a reciprocal of the sound velocity or a constant factor of a sound velocity. In other words, a parameter that changes according to degradation of a pipe may be a parameter (including a sound velocity itself) based on the sound velocity.

In addition to the above, the input/output unit 101 may transmit information relating to a water pressure of fluid flowing at an end point to the transfer characteristics derivation unit 102. The input/output unit 101 may transmit, for example, information indicating in what water pressure range a water pressure of fluid flowing at the end point varies. This information is usable when transfer characteristics to be described later are derived by the transfer characteristics derivation unit 102.

The input/output unit 101 transmits information of a water pressure at the end point of the pipe network to the computation unit 103. The information of the water pressure to be transmitted is, for example, wave data of a water pressure at respective end points (the points 1, 2, and 4 in the example illustrated in FIG. 2). The wave data of a water pressure are data indicating transition characteristics of the water pressure. The transition characteristics of the water pressure are information relating to transition of the water pressure that can change according to a state of a pipe network and the like. In other words, the transition characteristics of the water pressure are meaningful information relating to transition of the water pressure. The wave data of the water pressure are, for example, data indicating temporal changes of the water pressure. The data are, for example, a measured value acquired by a sensor.

Figure 3:
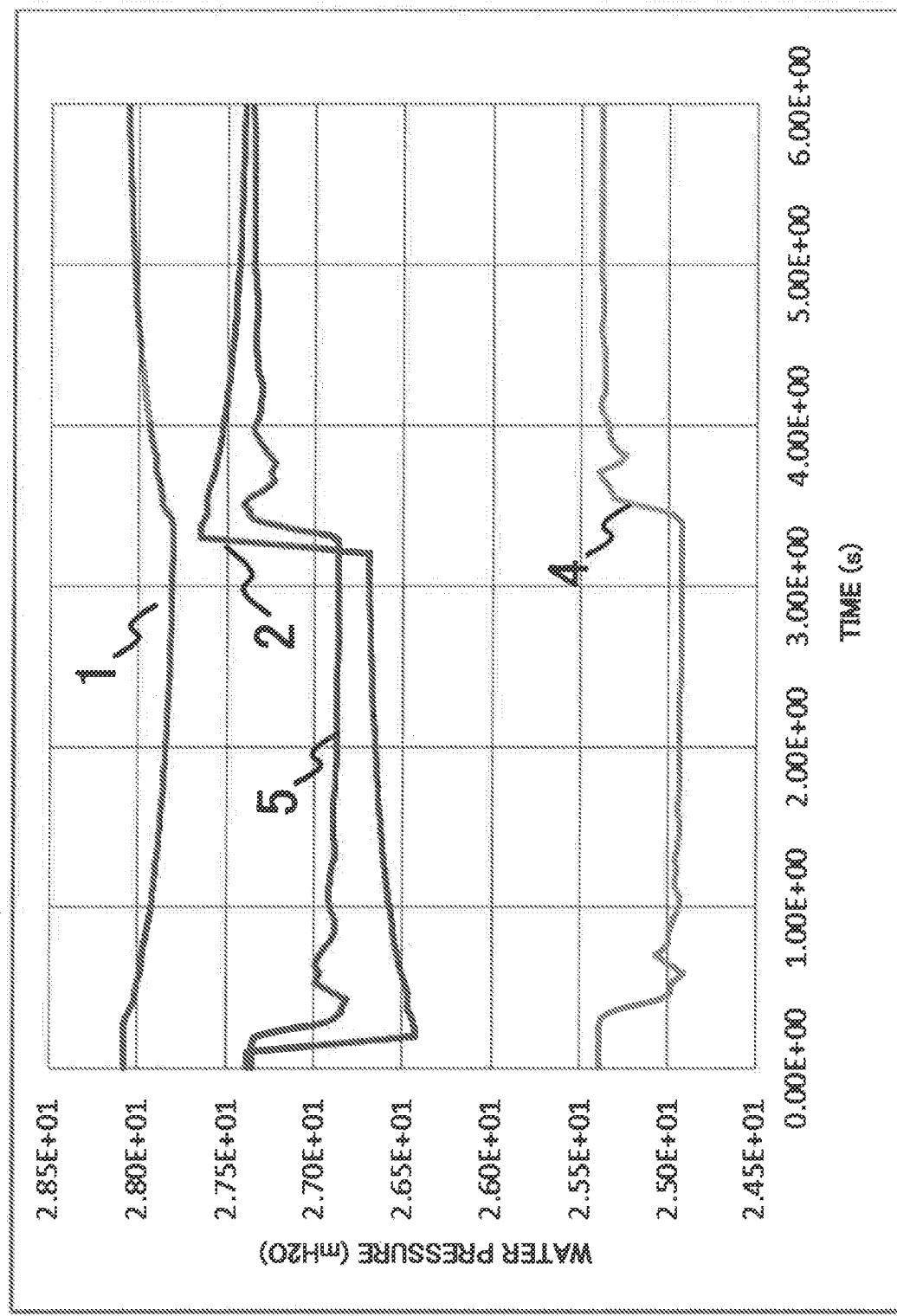
FIG. 3 is a graph illustrating an example of temporal changes of a water pressure at each point of a pipe network.

FIG. 3 is specific example of data respectively indicating a temporal change of a water pressure at each of the points. In FIG. 3, a number indicating a graph indicates a number of each point illustrated in FIG. 2. Note that, in the example illustrated in FIG. 3, while each data is represented by a graph, data handled by the analysis device 11 do not need to be graphed. The data may be a data string in which a time and a water pressure are associated with each other.

Wave data of a water pressure may be represented, for example, by information of an amplitude for each frequency of the water pressure, i.e. a frequency distribution. In this case, the wave data of the water pressure may include information of a phase for each frequency of the water pressure.

The input/output unit 101 may acquire wave data of a water pressure by input from the user or the like and transmit the acquired wave data to the computation unit 103. At that time, the input/output unit 101 may convert the acquired waveform of the water pressure to a frequency distribution and transmit the converted frequency distribution to the computation unit 103. When, for example, the acquired waveform is temporal changes of the water pressure, the input/output unit 101 can acquire a frequency distribution by Fourier-transforming the waveform. The input/output unit 101 may transmit the acquired frequency distribution to the computation unit 103.

The input/output unit 101 transmits wave data of the water pressure at an interior point (the point 5 in the example illustrated in FIG. 2) to the wave comparison unit 105. Hereinafter, wave data of the water pressure at an interior point transmitted by the input/output unit 101 are referred to also as input interior wave data. The input interior wave data may be a waveform of a time domain or a frequency distribution.

The input/output unit 101 transmits information of determination criteria to the determination unit 106. The determination criteria are criteria for determination executed by the determination unit 106. The information of determination criteria is, for example, a range of a value of an allowable inconsistency degree (an inconsistency degree is described later). In this case, when the inconsistency degree falls within a "range of a value of an allowable inconsistency degree", it can be said that the inconsistency degree satisfies determination criteria. The information of determination criteria may be an upper limit, i.e. a threshold of the allowable inconsistency degree. In this case, the determination unit 106 to be described later determines whether the inconsistency degree is equal to or less than the threshold.

The input/output unit 101 may transmit designation of a parameter to be modified among parameters relating to a pipe in an analysis range to the modification unit 107. The parameter to be modified is, for example, a sound velocity. The input/output unit 101 may provide information indicating that as a parameter to be modified, the sound velocity has been selected to the modification unit 107. The input/output unit 101 may designate only the sound velocity in a partial section of a pipe network as a parameter to be modified.

The parameter to be modified may be an amount of thinning. The modification unit 107 may modify a value of D/t of equation (1) in all pipes, for example, on the basis of an assumption that amounts of thinning in all pipes constituting a pipe network are approximately the same.

The input/output unit 101 receives information derived by the derivation unit 108 to be described later and outputs the received information to the user or the like.

===Transfer Characteristics Derivation Unit 102===

The transfer characteristics derivation unit 102 derives transfer characteristics relating to an end point and an interior point designated by the input/output unit 101, on the basis of information of a pipe network received from the input/output unit 101. The transfer characteristics refer to a value indicating a relation between voltage and current in a plurality of terminals or a set of values in an electrical circuit network. In other words, the transfer characteristics derivation unit 102 derives transfer characteristics relating to terminals corresponding to a designated end point and a designated interior point in which the pipe network is modeled by an electrical circuit network.

Modeling of a pipe network by the electrical circuit network is to create (i.e. assume) a model of the electrical circuit network capable of simulating a state of fluid flowing in a pipe network by associating a flow rate of fluid flowing in the pipe network with current and by associating a pressure with voltage. Current in a modeled electrical circuit network and a flow rate of fluid flowing in the pipe network can be converted to each other. Further, voltage and a pressure can be converted to each other.

The transfer characteristics derivation unit 102 derives, for example, as transfer characteristics based on an end point and an interior point for each frequency of voltage, a coefficient of an equation that associates voltage with current at a terminal corresponding to an end point and a terminal corresponding to an interior point.

As an example, first, the transfer characteristics derivation unit 102 models a state of the pipe network in a designated range by replacement with the electrical circuit network and simulates a behavior of the electrical circuit. The transfer characteristics derivation unit 102 derives, on the basis of the simulation, as transfer characteristics, a relation of voltage and current between a terminal (node) corresponding to an end point and a terminal (node) of an interior point designated by the input/output unit 101 in the electrical circuit network.

The transfer characteristics are represented, for example, by a matrix of $Y_{jk}$ ($1 \leq j \leq n$, $1 \leq k \leq n$) in the following equation.

[Math. 2]

$$\begin{bmatrix} I_1 \\ \vdots \\ I_n \end{bmatrix} = \begin{bmatrix} Y_{11} & \cdots & Y_{1n} \\ \vdots & \ddots & \vdots \\ Y_{n1} & \cdots & Y_{nn} \end{bmatrix} \begin{bmatrix} V_1 \\ \vdots \\ V_n \end{bmatrix} \quad (2)$$

wherein in the equation, $I_k$ ($1 \leq k \leq n$) is current flowing in from an outside of an electrical circuit network (or flowing out to an outside of the electrical circuit network) at a kth node (corresponding to a designated point) and $V_k$ is a voltage at the kth node.

A matrix including $Y_{jk}$ ($1 \leq j \leq n$, $1 \leq k \leq n$) in equation (2) is generally referred to as an admittance matrix. $Y_{jk}$ is referred to also as an admittance parameter.

An admittance matrix can be used for a computation equation capable of determining a current flowing in from an outside of an electrical circuit network (or flowing out to an outside of an electrical circuit network) at each node of the electrical circuit network from a voltage of each node.

An admittance matrix can be computed on the basis of a modeled electrical circuit network and electromagnetism laws by using an electrical circuit simulator such as a simulation program with integrated circuit emphasis (SPICE). The electrical circuit simulator may be, for example, a simulator using a characteristic curve method or a general simulator capable of computing a flow of electricity by using a finite element method or a particle method.

The transfer characteristics derivation unit 102 may compute an admittance matrix in cooperation with an electrical circuit simulator that is not illustrated. An electrical circuit simulator may be disposed outside the analysis device 11. Alternatively, the transfer characteristics derivation unit 102 may include a function equivalent to an electrical circuit simulator. The transfer characteristics derivation unit 102 transmits, from information of a pipe network received from the input/output unit 101, an electrical circuit network in which the pipe network is modeled and a designated point to an electrical circuit simulator and causes the electrical circuit simulator to compute an admittance matrix. The transfer characteristics derivation unit 102 acquires the computed admittance matrix as transfer characteristics. In this manner, the transfer characteristics derivation unit 102 derives transfer characteristics.

The transfer characteristics derivation unit 102 may include a function necessary for computing an admittance matrix, without including an electrical circuit simulator.

In equation (2), it is assumed that, for example, first to (n−1)th nodes correspond to end points and an nth node corresponds to an interior point. In this case, the transfer characteristics derivation unit 102 may derive, as transfer characteristics, elements associated with current of the nth node, i.e. only $Y_{n1}$ to $Y_{nn}$.

As described above, the transfer characteristics derivation unit 102 derives transfer characteristics for each frequency of voltage. The transfer characteristics derivation unit 102, for example, may provide sine waves of various frequencies to a terminal for an electrical circuit simulator, acquire output current, and thereby determine transfer characteristics for each frequency. The transfer characteristics derivation unit 102 may determine transfer characteristics for each frequency via Fourier transform from response characteristics upon providing an impulse waveform to an electrical circuit simulator.

The transfer characteristics derivation unit 102 transmits the derived transfer characteristics to the computation unit 103.

===Computation Unit 103===

The computation unit 103 computes wave data of a water pressure at an interior point on the basis of transfer characteristics for each frequency and wave data of a water pressure at an end point received from the input/output unit 101. Specifically, the computation unit 103 computes, for each frequency, an amplitude of a water pressure at an interior point on the basis of transfer characteristics and a value of an amplitude at each end point. Thereby, the computation unit 103 acquire an amplitude of a water pressure at an interior point, i.e. a frequency distribution with respect to each frequency.

A principle in which the computation unit 103 can compute a water pressure at an interior point is described. In the following description, it is assumed that an interior point to be a target for calculating a water pressure is an nth node.

From equation (2), the following equation (3) is derived.

[Math. 3]

$$I_n = Y_{n1}V_1 + \ldots + Y_{nn-1}V_{n-1} + Y_{nn}V_n. \quad (3)$$

In equation (3), an nth node is a terminal corresponding to an interior point, and therefore at this point, current does not flow out to an outside. In other words, $I_n$ can be set to be $I_n=0$. In accordance therewith, $I_n=0$ is substituted into equation (3) and the acquired equation is solved for $V_n$, and thereby the following equation (4) is obtained.

[Math. 4]

$$V_n = -\frac{Y_{n1}V_1 + \ldots + Y_{nn-1}V_{n-1}}{Y_{nn}} \quad (4)$$

Equation (4) is understood as an equation for determining a voltage of an nth node that is an interior point from a voltage of a node other than the nth node. In other words, on the basis of equation (4), the computation unit 103 can compute $V_n$ when values of $Y_{n1}$ to $Y_{nn}$ and values of $V_1$ to $V_{n-1}$ are found.

Especially when first to (n−1)th nodes correspond to end points, in equation (4), $V_1$ to $V_{n-1}$ each are a variable convertible from a water pressure at an end point. Therefore, the computation unit 103 can determine a value of $V_n$ from transfer characteristics ($Y_{n1}$ to $Y_{nn}$) and a water pressure at an end point. The computation unit 103 may determine $V_n$ and convert the determined $V_n$ to a water pressure. The converted value indicates a water pressure at an interior point. In this manner, the computation unit 103 can determine a water pressure at an interior point.

Equation (4) may be transformed without departing from the technical idea disclosed by the present example embodiment. Equation (4) may be transformed, for example, to an equation indicating a relation between a water pressure at an end point and a water pressure at an interior point on the basis of association between voltage and a water pressure. The computation unit 103 may directly acquire, on the basis of the equation, a water pressure at an interior point from a water pressure at an end point.

The computation unit 103 may convert the acquired frequency distribution to wave data of temporal changes via inverse Fourier transform or the like. Hereinafter, wave data (including data indicating a frequency distribution) generated via computation of the computation unit 103 are referred to also as computed interior wave data.

The computation unit 103 transmits the generated computed interior wave data to the wave comparison unit 105.

===Wave Comparison Unit 105===

The wave comparison unit 105 compares input interior wave data received from the input/output unit 101 and computed interior wave data computed by the computation unit 103. Wave data used for comparison may be a frequency distribution or a waveform of a time domain. In order to unify types of wave data used for comparison, the wave comparison unit 105 may convert a type of one waveform to a type of the other wave data. The wave comparison unit 105 may convert, when comparing, for example, two waveforms on the basis of a waveform of a time domain, a frequency distribution to a waveform of a time domain via inverse Fourier transform or the like.

The wave comparison unit 105 computes a difference between two pieces of wave data as comparison of two waveforms. The difference is information indicating a degree of dissimilarity between two pieces of data. The difference is, in other words, information indicating a degree of inconsistency. Information (hereinafter, an "inconsistency degree") indicating a degree of inconsistency between two pieces of wave data may be represented, for example, by a magnitude or ratio of inconsistency. An inconsistency degree between two pieces of wave data may be determined, for example, on the basis of a total of absolute values of differences of numerical values at respective characteristic points of two pieces of wave data. A method for calculating an inconsistency degree is not limited thereto. Further, the wave comparison unit 105 may compute a degree of consistency (similarity) instead of an inconsistency degree. A degree of consistency may be computed, for example, on the basis of a number in which frequencies are consistent with each other among a plurality of characteristic points extracted in respective wave data or the like.

In the following description, it is assumed that the wave comparison unit 105 computes an inconsistency degree between two waveforms. It is assumed that a value of the inconsistency degree becomes larger as a degree of inconsistency is larger. Note that an inconsistency degree changes depending on a pipe network model used in the transfer characteristics derivation unit 102, and therefore an inconsistency degree can be said to be one indicator indicating accuracy of a pipe network model. The accuracy of a pipe network model is, i.e. correctness of information (a sound velocity or the like) of a pipe network used in generating a pipe network model.

===Determination Unit 106===

The determination unit 106 determines whether accuracy of a pipe network model satisfies a predetermined condition. In the present example embodiment, the determination unit 106 determines whether an inconsistency degree computed by the wave comparison unit 105 satisfies determination criteria received from the input/output unit 101. The determination unit 106 determines, when having received, for example, an "upper limit value of an allowable inconsistency degree", i.e. a threshold from the input/output unit 101, whether an inconsistency degree is equal to or less than the threshold. At that time, the determination unit 106 determines, when an inconsistency degree is equal to or less than the threshold, that the inconsistency degree satisfies determination criteria and determines, when an inconsistency degree exceeds the threshold, that the inconsistency degree does not satisfy the determination criteria.

When an inconsistency degree does not satisfy determination criteria, the analysis device 11 executes processing to be described later by the modification unit 107. When an inconsistency degree satisfies the determination criteria, the analysis device 11 executes processing to be described later by the derivation unit 108. In this case, the determination unit 106 may transmit a final value of a modified parameter to the derivation unit 108.

===Modification Unit 107===

The modification unit 107 modifies a value of a parameter designated from the input/output unit 101 in an analysis model 20. In the present description, a parameter to be modified is a sound velocity in one or more pipes among pipes constituting a pipe network. The modification unit 107 may modify a value of a parameter, for example, on the basis of a value of an inconsistency degree. In the modification, an algorithm in which determination and modification executed by the determination unit 106 are repeated and thereby a value of a parameter approaches an optimum value is used. The modification unit 107 may execute the above-described modification, for example, on the basis of the Nelder-Mead method or a genetic algorithm. The modification method may be a method using a Kalman filter.

The modification unit 107 transmits a modified value, i.e. a modification value, for example, to the input/output unit 101. The input/output unit 101 transmits information of a pipe network in which the received modification value is reflected to the transfer characteristics derivation unit 102. Thereby, on the basis of information of a pipe network in which a modification value is reflected, the transfer characteristics derivation unit 102 computes transfer characteristics again.

===Derivation Unit 108===

The derivation unit 108 derives information relating to degradation of a pipe on the basis of a value of a modified parameter.

The information relating to degradation is, for example, information indicating a degree of degradation, i.e. a progress status of degradation.

A value of a sound velocity that is a parameter modified in the present example embodiment is a value that changes depending on a wall thickness of a pipe and therefore is information indicating a degree of degradation. Therefore, the derivation unit 108 may handle a modified value itself of a sound velocity as information relating to degradation of a pipe.

The derivation unit 108 may compute a degree in which a value of a sound velocity has decreased, compared with a reference value. The reference value at that time may be, for example, a value of a sound velocity computed on the basis of a design value or a value of a sound velocity computed on the basis of the same determination criteria by analysis executed for the same pipe network as a target in a past. When a reference value is based on a value of a sound velocity in a pipe network model in which the same determination criteria were satisfied in analysis executed for the same pipe network as a target in a past, it becomes clear how much a pipe was degraded from the time of the past.

A value of a wall thickness of a pipe is one piece of information relating to degradation of a pipe. The derivation unit 108 may derive a value of a wall thickness of a pipe on the basis of a value of a sound velocity and equation (1). The derivation unit 108 may further derive a ratio of the derived value of the wall thickness to a reference value (a design value or the like).

The derivation unit 108 may be configured to be able to refer to a database (not illustrated) that stores a reference value. The derivation unit 108 may derive information relating to degradation on the basis of information included in the database.

The information relating to degradation may be any one of a text, a sign, and a signal or a combination of these indicating either "being degraded" or "being not degraded". The derivation unit 108 may output, when, for example, a value of a sound velocity departs from predetermined criteria (e.g. a preset range), information that means that "a pipe is being degraded". The predetermined criteria may be set by the user or a designer of the analysis device 11 via the input/output unit 101 or the like. When the predetermined criteria are based on a value of a sound velocity in a pipe network model in which the same determination criteria were satisfied in analysis executed for the same pipe network as a target in a past, a finding about a degradation status from the time of the past can be acquired.

The information relating to degradation may be any one of a text, a sign, and a signal or a combination of these that evaluates a level of degradation in multiple stages.

The derivation unit 108 transmits the derived information, for example, to the input/output unit 101.

<Operation>

Figure 4:
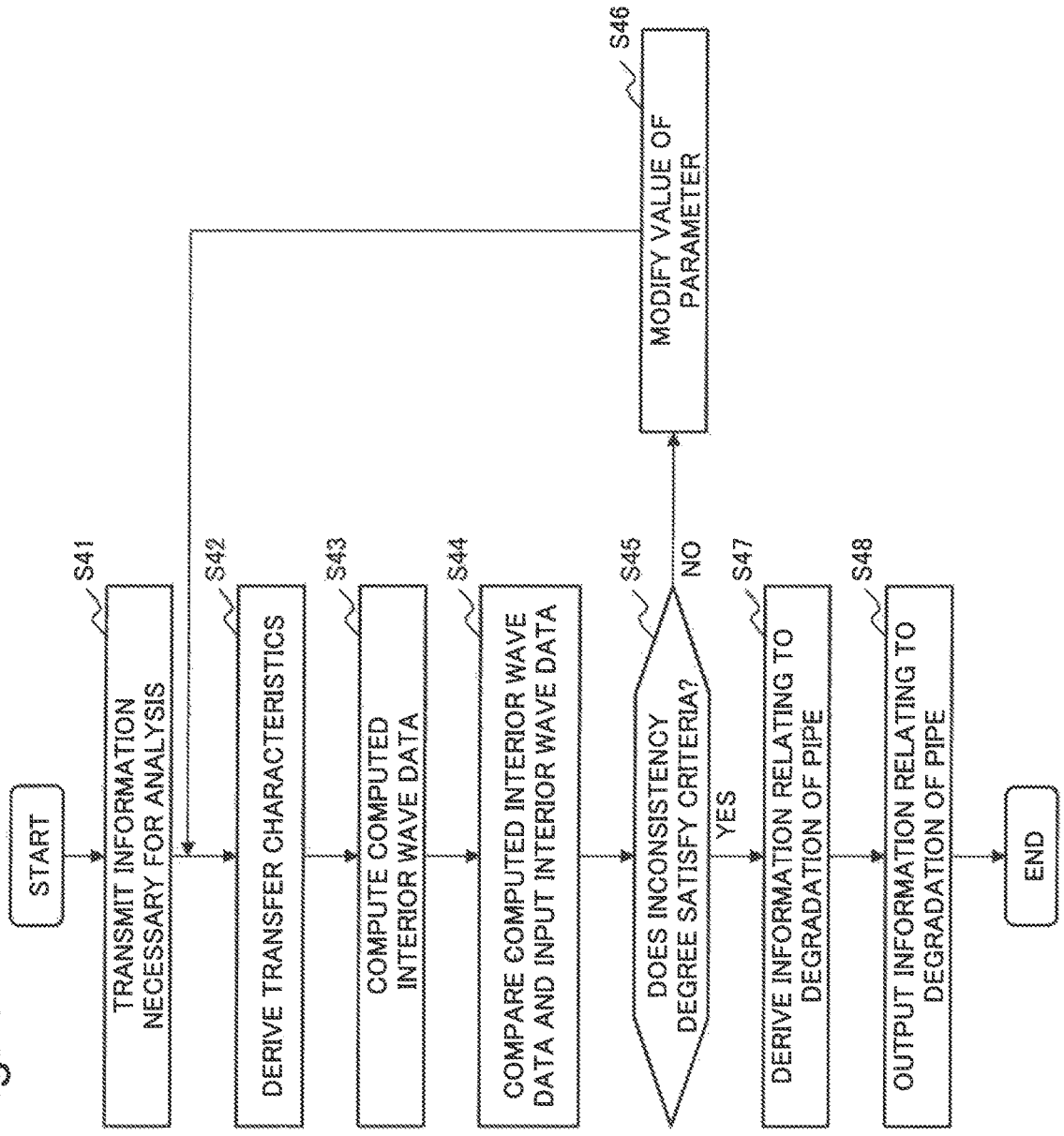
FIG. 4 is a flowchart illustrating a flow of an operation of the analysis device according to the first example embodiment.

An operation of the analysis device 11 according to the first example embodiment is described with description of a specific example. FIG. 4 is a flowchart illustrating a flow of an operation of the analysis device 11 according to the present example embodiment.

First, the input/output unit 101 transmits information necessary for analysis to the transfer characteristics derivation unit 102 (step S41). The information necessary for analysis includes, for example, structure information (including designation of an end point and an interior point) of a pipe network and information of a parameter that changes depending on a wall thickness of a pipe.

Specifically, the input/output unit 101 transmits, when transmitting information of the pipe network exemplarily illustrated in FIG. 2 to the transfer characteristics derivation unit 102, a connection relation among the points 1, 2, 3, 4, and 5 and a parameter relating to a pipe between respective points. It is assumed that as an example, the input/output unit 101 has transmitted information of a pipe network to the transfer characteristics derivation unit 102 in which a pipe length between the point 1 and the point 5 is 100 m, a diameter of the pipe is 30 mm, and a flow coefficient is 100; a pipe length between the point 5 and the point 3 is 20 m, a diameter of the pipe is 30 mm, and a flow coefficient is 100; a pipe length between the point 3 and the point 2 is 80 m, a diameter of the pipe is 25 mm, and a flow coefficient is 80; and a pipe length between the point 3 and the point 4 is 120 m, a diameter of the pipe is 30 mm, and a flow coefficient is 100. Further, the input/output unit 101 transmits, for example, a value of a sound velocity between respective points as information of a parameter that changes depending on a wall thickness of a pipe. It is assumed that as an example, the input/output unit 101 has transmitted, to the transfer characteristics derivation unit 102, 1200/m/s as a sound velocity between the point 1 and the point 4 and 1150 m/s as a sound velocity between the point 3 and the point 2.

The input/output unit 101 transmits, to the computation unit 103, wave data of a water pressure at an end point (the points 1, 2, and 4 in the example illustrated in FIG. 2).

The input/output unit 101 transmits, to the wave comparison unit 105, wave data of a water pressure at an interior point (the point 5 in the example illustrated in FIG. 2).

The input/output unit 101 transmits information of determination criteria to the determination unit 106. The input/output unit 101 transmits, for example, a numerical value of "0.1" to the determination unit 106 as information of determination criteria. The determination unit 106 executes on the basis of the information, determination of step S46 to be described later in which determination criteria are set as follows: "an inconsistency degree is equal to or less than 0.1".

The input/output unit 101 transmits, to the modification unit 107, designation of a parameter to be modified in an analysis model 20. In the present description, the input/output unit 101 designates a sound velocity between the point 1 and the point 4 as a parameter to be modified.

The transfer characteristics derivation unit 102 derives transfer characteristics on the basis of information of a pipe network (step S42). The transfer characteristics derivation unit 102 computes, when receiving information of the pipe network exemplarily illustrated in FIG. 2, for example, an admittance matrix representing a relation between voltage and current at nodes corresponding to the points 1, 2, 4, and 5 in an electrical circuit network in which the pipe network is modeled.

When computing the above-described admittance matrix, the transfer characteristics derivation unit 102 models, on the basis of information of a pipe network received from the input/output unit 101, the pipe network as an electrical circuit network. Specifically, the transfer characteristics derivation unit 102 generates data for simulating an electrical circuit network in which a pipe network is modeled.

The transfer characteristics derivation unit 102 may model an element (a pipe or the like) constituting a pipe network by a combination of circuit elements. For example, a pipe 301 constituting a pipe network may be associated with an electrical circuit 302 that includes a coil 311, a capacitor 312, and a resistance 313, as exemplarily illustrated in FIG. 5. Therefore, the transfer characteristics derivation unit 102 may model, for example, pipes 301 connecting points illustrated in FIG. 2 by using electrical circuits 302, respectively. At that time, an inductance L of the coil 311, a capacitance C of the capacitor 312, and a resistance value R of the resistance 313 in the electrical circuit 302 are determined by the following equation (5), respectively.

Figure 5:
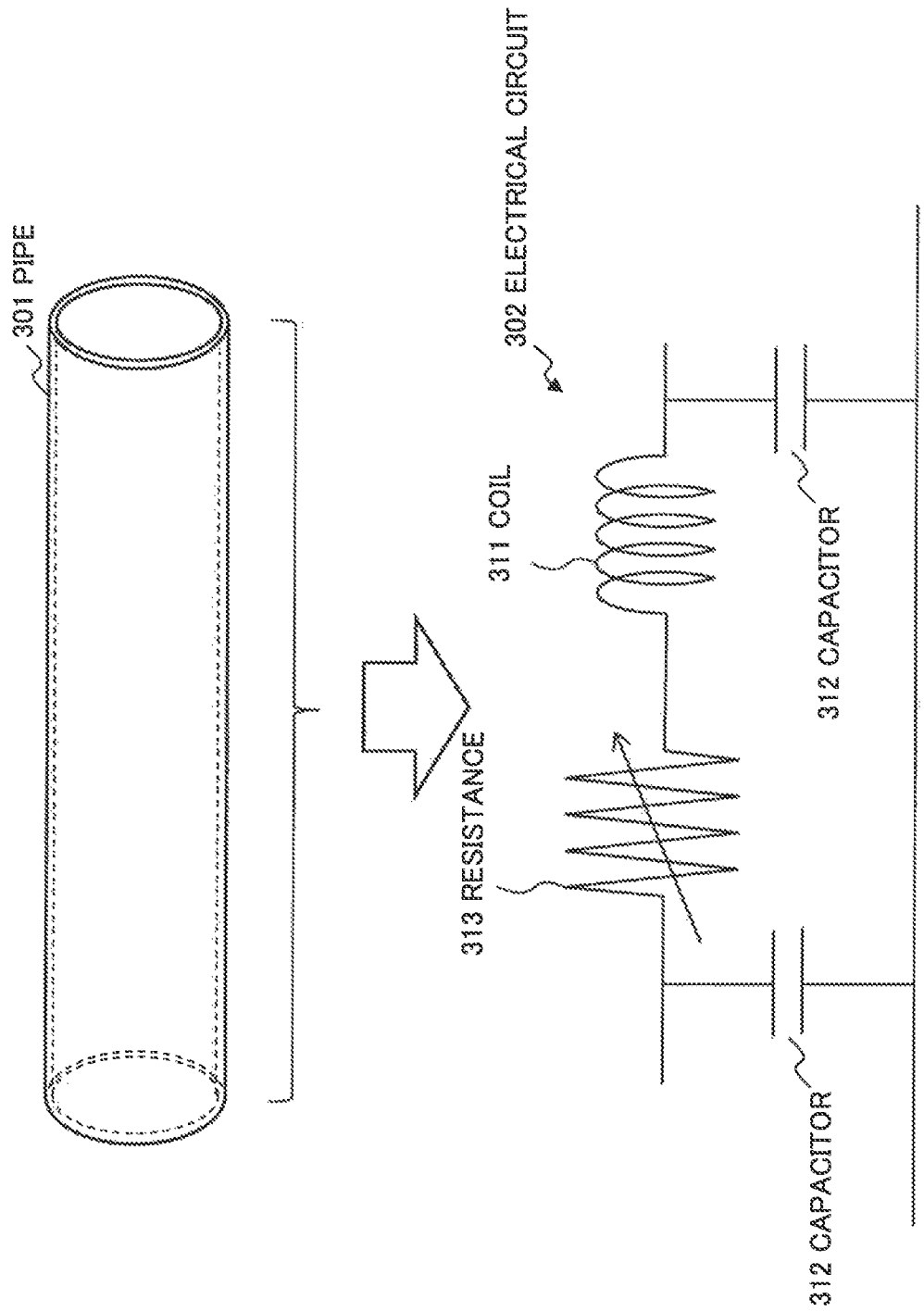
FIG. 5 is a conceptual diagram illustrating an example in which a water pipe is replaced with an electrical circuit.

[Math. 5]

$$L = \frac{l}{gA}, C = \frac{lgA}{a^2}, R = \frac{f(V)}{2gD} \qquad (5)$$

where:
l: a pipe length
g: a gravity acceleration
A: a pipe cross-section area
c: a sound velocity
$f(Q)$: a function which depends on a flow rate
D: a diameter of a pipe The transfer characteristics derivation unit 102 virtually constructs, for example, an electrical circuit network generated by replacing a pipe between respective points of a pipe network with an electrical circuit 302 that includes a coil 311, a capacitor 312, and a resistance 313 as illustrated in FIG. 5. Specifically, the transfer characteristics derivation unit 102 generates, for example, data for generating an electrical circuit network in which a pipe between respective points is modeled by the electrical circuit 302 and transmits the data to an electrical circuit simulator. Thereby, an electrical circuit network based on a pipe network is virtually generated. Note that, hereinafter, a model generated on the basis of a pipe network is referred to as a "pipe network model".

Figure 6:
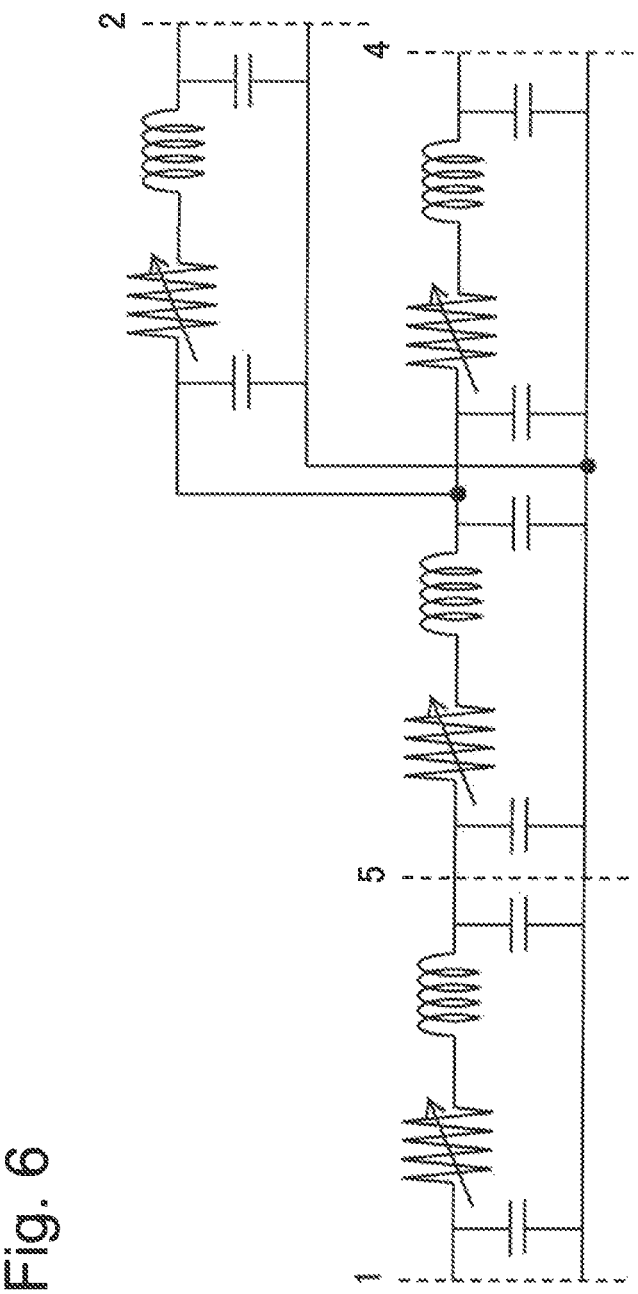
FIG. 6 is an example of an electrical circuit network in which the pipe network illustrated in FIG. 2 is modeled.

An electrical circuit network generated by modeling each pipe of the pipe network illustrated in FIG. 2 by using the above-described electrical circuit 302 is as illustrated in FIG. 6. In FIG. 6, a dashed line assigned with a number indicates a position of a terminal corresponding to each point of the pipe network illustrated in FIG. 2.

The transfer characteristics derivation unit 102 may use, instead of the resistance 313, a circuit element in which a magnitude of a pressure dropped by the resistance 313 (a pressure drop). When the pressure drop is designated as P, P can be represented, for example, by the following equation (6) based on the Hazen-Williams equation.

[Math. 6]

$$P = \frac{10.67 l Q^{1.85}}{C_Q^{1.85} D^{4.87}} \qquad (6)$$

where:
P: a pressure loss (i. e. loss of water head),
$C_Q$: a flow coefficient,
D: a diameter of a pipe,
l: a pipe length, and
Q: a flow rate (obtained from a product of a flow velocity and a pipe cross-section area).

In equation (6), a flow coefficient is a constant indicating flowability of fluid in a pipe in the Hazen-Williams equation. A flow coefficient can be determined, for example, according to years in use.

Equation (6) is an example in which fluid flowing in a pipe network is water, and as an equation representing a pressure drop, an appropriate equation according to a type of fluid and various conditions is usable.

The transfer characteristics derivation unit 102 may use, as an electrical circuit network, a circuit element representing a pressure drop, for example, as illustrated in equation (6). The transfer characteristics derivation unit 102 may use, for example, a non-linear voltage source that changes in output voltage depending on current and thereby model the resistance 313.

The transfer characteristics derivation unit 102 transmits, to an electrical circuit simulator, data for simulating an electrical circuit network generated by modeling as described above. The transfer characteristics derivation unit 102 causes the electrical circuit simulator to compute an admittance matrix relating to a node corresponding to an end point and a node corresponding to an interior point (the points 1, 2, 4, and 5 in the example illustrated in FIG. 2) based on the electrical circuit model.

The transfer characteristics derivation unit 102 executes, by using an electrical circuit simulator, for example, analysis using an input signal having a small amplitude, the analysis being referred to as small-single analysis and thereby computes an admittance matrix. The small-signal analysis is an analysis method in which an amplitude of an input signal is assumed to be small and thereby a non-linear element in an electrical circuit can be regarded as a linear element. In the small-signal analysis, under an assumption that an amplitude of an input signal is small, a small-signal model including a linear element is assumed and thereby an output for a voltage of a designated frequency can be computed. In other words, according to the small-signal analysis, even when an electrical circuit includes a circuit element representing a non-linear relation between voltage and current as described above, an admittance matrix can be approximately computed numerically.

The transfer characteristics derivation unit 102 acquires an admittance matrix acquired via computation as transfer characteristics. The transfer characteristics derivation unit 102 derives, as transfer characteristics, when computing, for example, an admittance matrix relating to the points 1, 2, 4, and 5 in the example illustrated in FIG. 2, values of $Y_{11}, Y_{12}, Y_{14}, Y_{15}, Y_{21}, Y_{22}, Y_{24}, Y_{25}, Y_{41}, Y_{42}, Y_{44}, Y_{45}, Y_{51}, Y_{52}, Y_{54}$, and $Y_{55}$ corresponding to respective elements of the admittance matrix of equation (2). The transfer characteristics derivation unit 102 may determine only a value of an element relating to the point 5. In other words, the transfer characteristics derivation unit 102 may determine, as transfer characteristics, $Y_{51}, Y_{52}, Y_{54}$, and $Y_{55}$ corresponding to $Y_{n1}$ to $Y_{nn}$ in equation (3). The transfer characteristics derivation unit 102 transmits the derived transfer characteristics to the computation unit 103.

The computation unit 103 computes computed interior wave data that are wave data at an interior point (the point 5 in the example illustrated in FIG. 2) on the basis of transfer characteristics and a water pressure at an end point (the points 1, 2, and 4 in the example of FIG. 2) received from the input/output unit 101 (step S43). Specifically, description is made following the example illustrated in FIG. 2 as follows: first, the computation unit 103 computes values of $V_1$ to $V_4$ (corresponding to $V_1$ to $V_{n-1}$ in equation (4)) by converting a value of a water pressure in an end point to a value of voltage. The computation unit 103 substitutes values of $V_1$ to $V_4$ and $Y_{51}$ to $Y_{55}$ into equation (4) and determines a value of $V_5$ (corresponding to $V_n$ in equation (4)). The computation unit 103 converts the determined $V_5$ to a value of a water pressure and computes the converted value as a value of a water pressure at an interior point.

In step S44, the wave comparison unit 105 compares computed interior wave data computed by the computation unit 103 and input interior wave data transmitted by the input/output unit 101. Specifically, the wave comparison unit 105 computes an inconsistency degree between the computed interior wave data determined by the computation unit 103 and the input interior wave data transmitted by the input/output unit 101.

Figure 7:
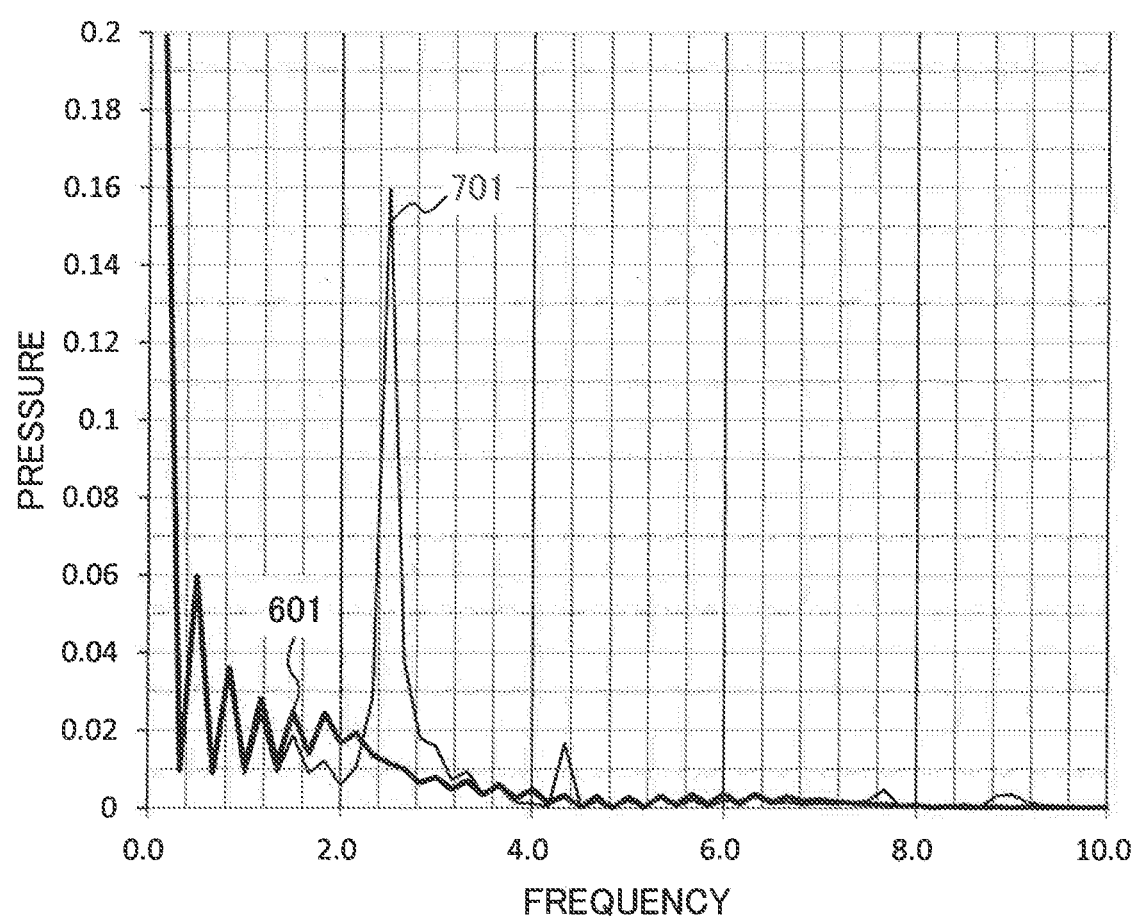
FIG. 7 is an example in which a graph of input interior wave data and a graph of computed interior wave data based on a parameter before modification are displayed in an overlapped manner.

FIG. 7 is an example of a graph (a graph 701) of a computed interior waveform and a graph (a graph 601) of an input interior waveform in which a sound velocity between the point 1 and the point 4 is 1200 m/s.

In the present description, the wave comparison unit 105 computes an inconsistency degree between the above-described two pieces of wave data represented by a frequency distribution. As an example, the wave comparison unit 105 determines absolute values of differences of water pressures at a frequency of every ⅙ Hz from ⅙ Hz to 10 Hz, respectively and totalizes these values. The wave comparison unit 105 computes the totalized value as a value of an inconsistency degree. As an example, it is assumed that the value of the inconsistency degree computed by the wave comparison unit 105 is 0.29.

The wave comparison unit 105 transmits the computed value of the inconsistency degree to the wave comparison unit 105.

Next, the determination unit 106 determines whether an inconsistency degree satisfies determination criteria (step S45). When the inconsistency degree computed by the wave comparison unit 105 does not satisfy determination criteria (NO in step S45), processing of the analysis device 11 does not escape from repetitive processing and moves to step S46.

Determination criteria in description of the present operation example is that "an inconsistency degree is equal to or less than 0.1". When an inconsistency degree is 0.29, the determination criteria are not satisfied, and therefore processing of the analysis device 11 moves to step S46.

When an inconsistency degree satisfies the determination criteria (YES in step S45), processing of the analysis device 11 moves to step S47.

In step S46, the modification unit 107 modifies a value of a parameter. The modification unit 107 transmits the modified value to the input/output unit 101. The input/output unit 101 transmits the received modification value to the transfer characteristic derivation unit 102.

The analysis device 11 executes an operation from step S42 to S45 again by using the value modified by the modification unit 107. The analysis device 11 repeats this processing until a value of an inconsistency degree satisfies the determination criteria. Thereby, a value that satisfies the determination criteria of the parameter is determined.

The determination unit 106 may be configured to terminate repetitive processing when an inconsistency degree does not yet satisfy determination criteria or an inconsistency degree is not improved after a predetermined number of times or a predetermined time elapse, in the above-described repetitive processing.

It is assumed that when a value of a sound velocity between the point 1 and the point 4 is modified to 1000 m/s, a value of an inconsistency degree is 0.08. This value satisfies the determination criteria, and therefore processing of the analysis device 11 escapes from repetitive processing and moves to step S47.

In step S47, the derivation unit 108 derives information relating to degradation on the basis of a determined value of a sound velocity. It is assumed that the derivation unit 108 outputs, for example, a signal indicating "normal" when a value of a sound velocity falls within a range from 1050 to 1200 m/s and outputs a signal indicating "degradation" when a value of a sound velocity falls outside the range from 1050 to 1200 m/s. In this case, when a determined value of a sound velocity is 1000 m/s, the derivation unit 108 outputs a signal indicating "degradation". The derivation unit 108 may alternatively compute a value of a ratio between the determined value of the sound velocity and a value of a sound velocity computed in a past. When a previously computed value of a sound velocity is 1200 m/s, a value of 83% may be output.

The derivation unit 108 may transmit the derived information to the input/output unit 101.

The input/output unit 101 outputs the information received from the derivation unit 108, for example, to the user (step S48). In this manner, the user acquires information relating to a wall thickness of a pipe derived by the analysis device 11.

Figure 8:
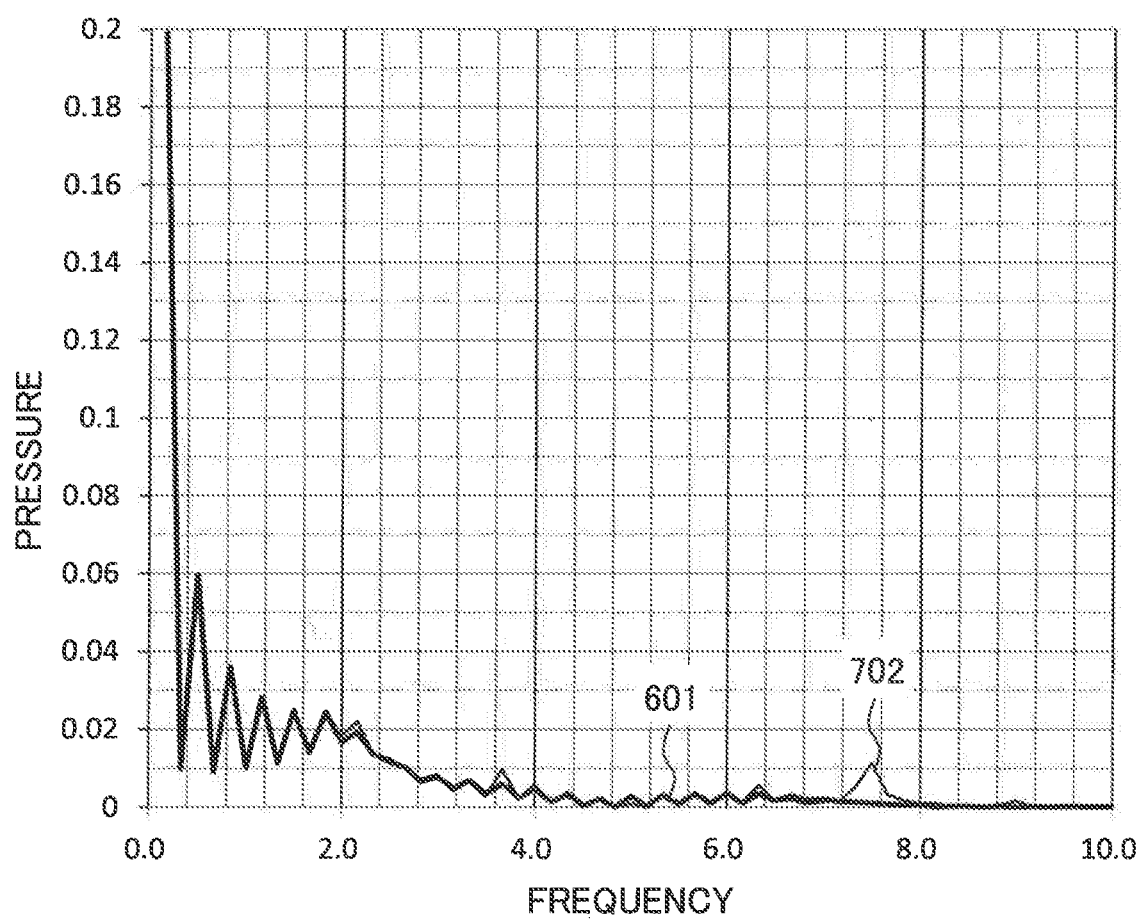
FIG. 8 is an example in which a graph of input interior wave data and a graph of computed interior wave data based on a parameter after modification are illustrated in an overlapped manner.

The input/output unit 101 may display, in output, a graph of computed interior wave data computed by using a modification value and a graph of input interior wave data in an overlapped manner. FIG. 8 is an example in which graphs of the two pieces of wave data are displayed in an overlapped manner. In FIG. 8, a graph 601 is a graph of input interior wave data and a graph 702 is a graph of computed interior wave data in which a value of a sound velocity is 1000 m/s. By such display, an output destination (e.g. the user) can intuitively understand accuracy of a pipe network model analyzed by the analysis device 11.

Advantageous Effect

According to the present example embodiment, an output destination (e.g. the user) can acquire information relating to degradation of a pipe to be analyzed. The reason is that when accuracy of a pipe network model based on information including a parameter that changes in value according to degradation of a pipe satisfies a predetermined condition, information relating to degradation based a value of the parameter can be derived.

Data used by the analysis device 11 include structure information of a pipe network, wave data at an end point in an analysis range, and wave data at an interior point. When an accessible point existing in piping such as an air vent valve and a fire hydrant is set as an end point, the user can easily acquire wave data. Therefore, the analysis device 11 can acquire information relating to degradation of a pipe on the basis of information that can be acquired by a simple method.

The modification unit 107 modifies a value of a parameter until an inconsistency degree satisfies determination criteria, and thereby the analysis device 11 can derive information relating to degradation with accuracy desired by the user.

The analysis device 11 modifies an analysis model by changing only a sound velocity and thereby can extract changes of information relating to an internal diameter and a wall thickness of a pipe.

Modified Example

Figure 9:
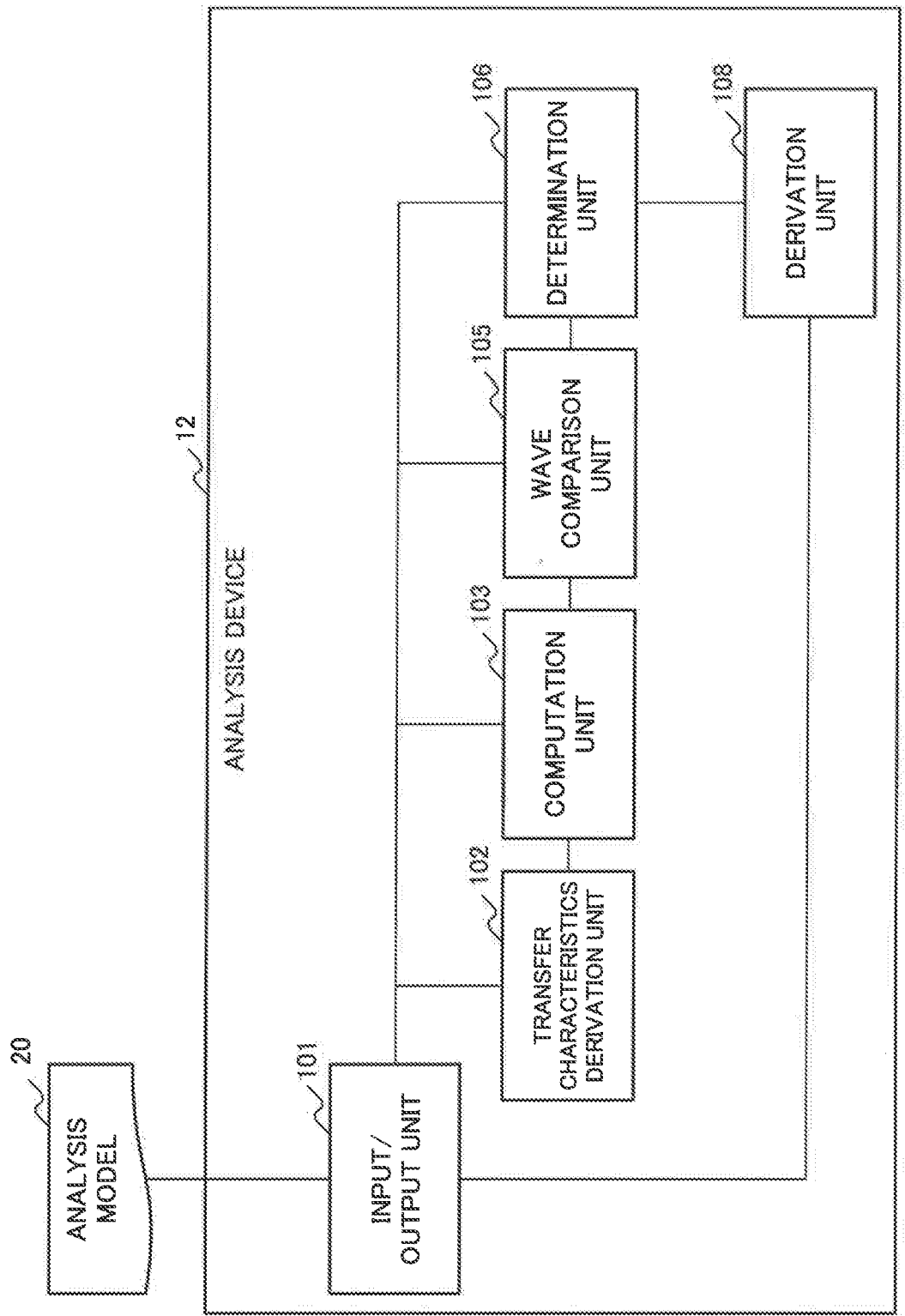
FIG. 9 is a block diagram illustrating a configuration of a modified example of the analysis device according to the first example embodiment.

FIG. 9 is a block diagram illustrating a configuration of an analysis device 12 that is a modified example of the first example embodiment.

The analysis device 12 may not necessarily include a modification unit 107.

In the analysis device 12, a determination unit 106 transmits, to a derivation unit 108, a result acquired by determining whether or not an inconsistency degree satisfies determination criteria.

The derivation unit 108 derives information different according to a determined result. The derivation unit 108, for example, may output a signal indicating "accuracy falls within an allowable range" when an inconsistency degree satisfies determination criteria and output a signal indicating "accuracy falls outside the determination criteria" when an inconsistency degree does not satisfy the determination criteria.

Information derived in this manner is information that changes according to a result of determination and therefore is one piece of information relating to a wall thickness of a pipe based on a value of a parameter.

An output destination can know, by using derived information, whether or not a value of a parameter received from an input/output unit 101 falls within an allowable range of accuracy. In other words, the output destination can acquire information relating to degradation of a pipe.

<Main Configuration>

Figure 10:
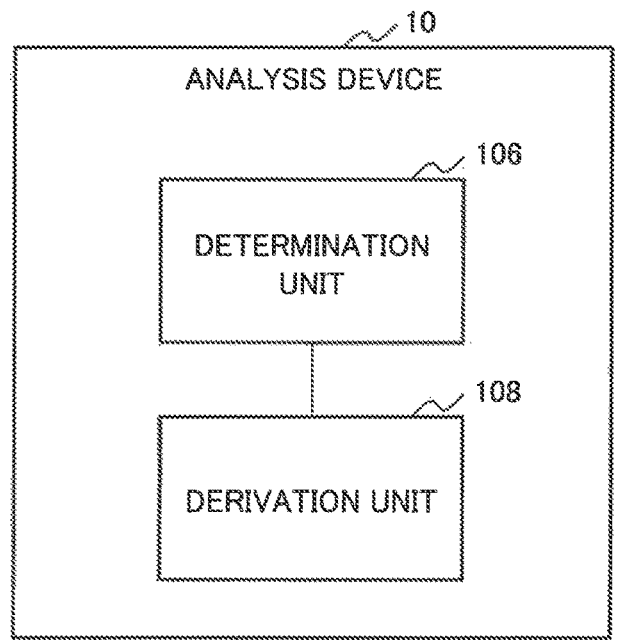
FIG. 10 is a block diagram illustrating a main configuration of an analysis device according to one example embodiment of the present invention.

A main configuration of an analysis device according to one example embodiment of the present invention is described. FIG. 10 is a block diagram illustrating a configuration of an analysis device 10 according to the one example embodiment of the present invention.

The analysis device 10 includes a determination unit 106 and a derivation unit 108.

The determination unit 106 determines whether accuracy of a pipe network model based on information including a parameter that changes in value according to degradation of a pipe constituting a pipe network satisfies a predetermined condition.

A pipe network model can be generated by a functional configuration that is not illustrated, on the basis of a configuration of a pipe, characteristics of the pipe, wave data at an end point, wave data at an interior point, and the above-described parameter.

The derivation unit 108 derives information relating to degradation of a pipe based on a parameter when accuracy of a pipe network model satisfies a predetermined condition.

Figure 11:
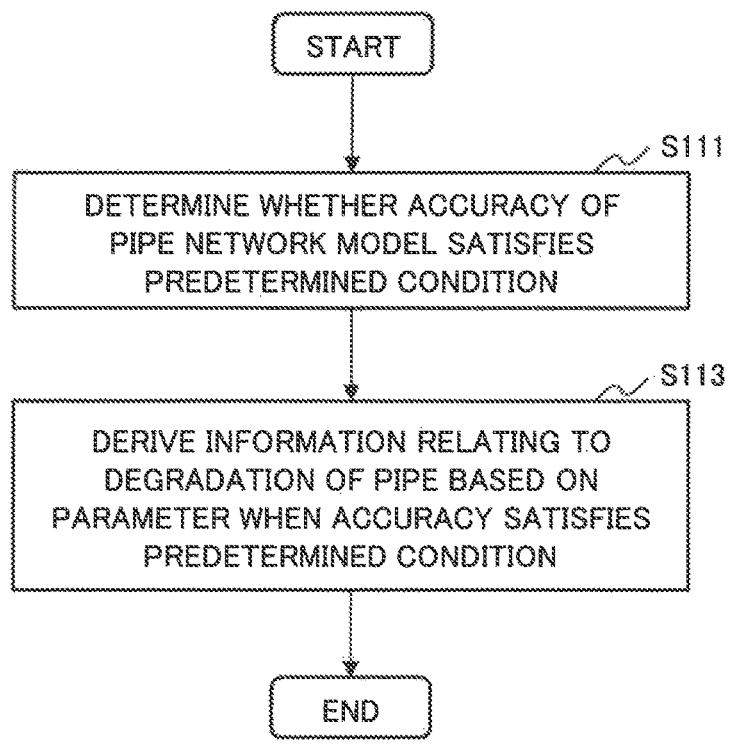
FIG. 11 is a flowchart illustrating a flow of a main operation of the analysis device of the one example embodiment of the present invention.

FIG. 11 is a flowchart illustrating a flow of operations of the respective components of the analysis device 10.

In step S111, the determination unit 106 determines whether accuracy of a pipe network model based on information including a parameter that changes in value according to degradation of a pipe constituting a pipe network satisfies a predetermined condition.

The derivation unit 108 derives, when the accuracy of the pipe network model satisfies the predetermined condition, information relating to degradation of a pipe based on the parameter (step S113).

According to the present configuration, information relating to degradation of a pipe can be acquired on the basis of information that can be acquired by a simple method.

<<Configurations of Hardware and a Software Program (Computer Program)>>

Hereinafter, a hardware configuration capable of realizing the respective example embodiments described above is described.

A part or the whole of the analysis device described in the respective example embodiments may include dedicated hardware. In this case, a part or the whole of the respective components may be realized as integrated hardware (an integrated circuit mounted with a logic that executes processing or the like).

When, for example, the respective components are realized by hardware, the respective components may be mounted as a system on a chip (SoC) or the like in which circuits that can provide respective functions are integrated. In this case, for example, data stored on the respective components may be stored on a storage area of a random access memory (RAM) integrated as an SoC or a storage area of a flash memory.

In this case, as a communication line that connects the respective components, a well-known communication bus is employable. The communication line that connects the respective components is not limited to bus connection. Respective components may be connected in a peer-to-peer manner.

Figure 12:
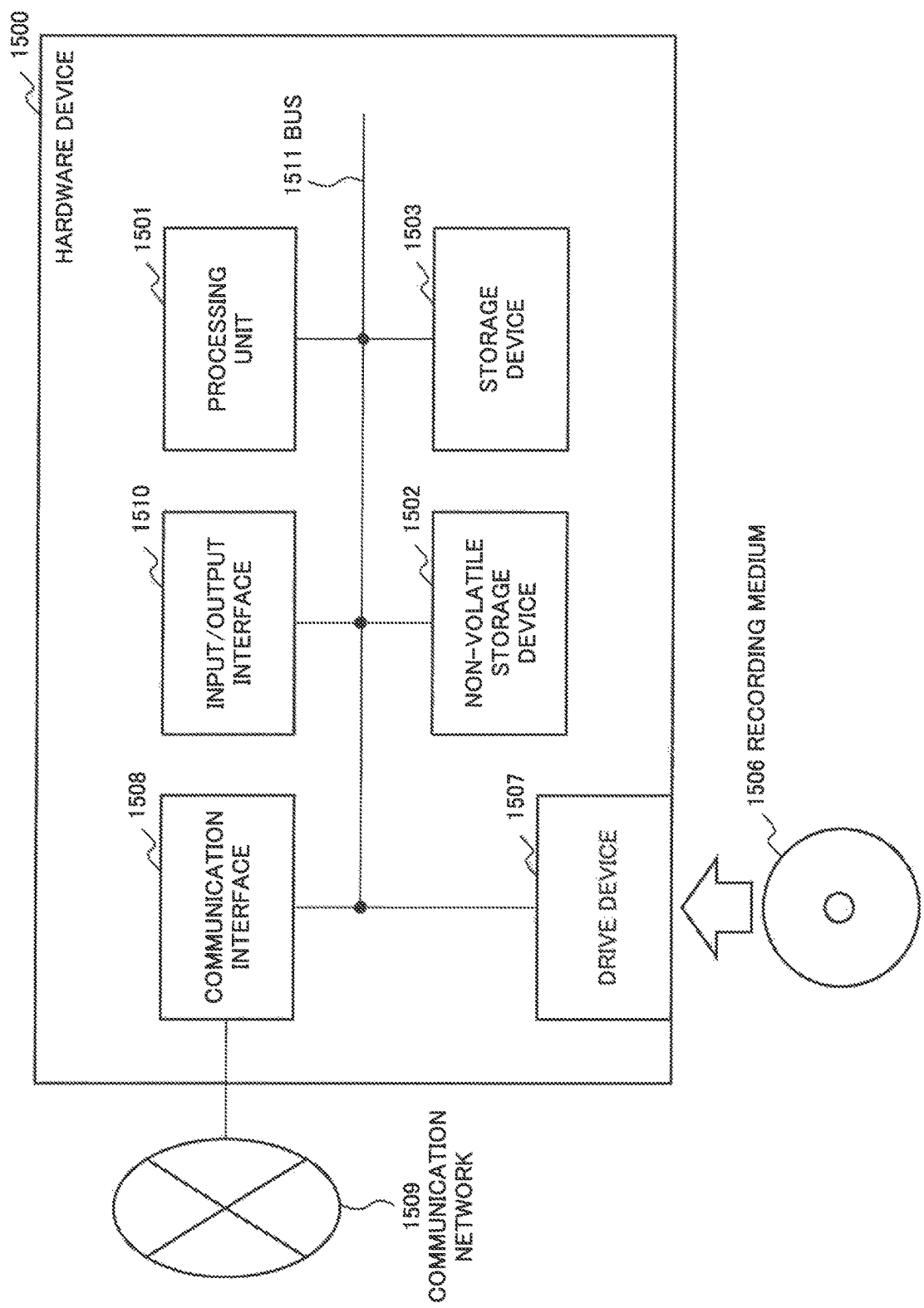
FIG. 12 is a block diagram exemplarily illustrating a hardware configuration capable of realizing a pipe network analysis device in each example embodiment of the present invention.

The above-described analysis device or components of the analysis device may be realized by a possible combination of a part or the whole of pieces of hardware as exemplarily illustrated in FIG. 12 and various software programs (computer programs) executed by the hardware.

Respective components of a hardware device 1500 are mutually communicable via a bus 1511.

A processing unit 1501 is an arithmetic processing device such as a general-purpose CPU and a microprocessor. The processing unit 1501 may read various software programs stored, for example, on a non-volatile storage device 1502 to be described later onto a storage device 1503 and execute processing in accordance with a read software program. Any one or all of the transfer characteristics derivation unit 102, the computation unit 103, the wave comparison unit 105, the determination unit 106, the modification unit 107, and the derivation unit 108 of respective example embodiments may execute respective arithmetic processings by using the processing unit 1501.

The storage device 1503 is a memory device such as a RAM that can be referred to from the processing unit 1501 and stores a software program, various pieces of data, and the like. Note that the storage device 1503 may be a volatile memory device.

The non-volatile storage device 1502 is a non-volatile storage device such as a magnetic disk drive and a semiconductor storage device based on a flash memory. The non-volatile storage device 1502 can store a software program, data, and the like. Conversion information that associates a component of a pipe network with a component of an electrical circuit network that models the component of the pipe network may be stored on the non-volatile storage device 1502 by using a format such as a file and a database.

A communication interface 1508 is an interface device for connection to a communication network 1509. The communication interface 1508 may be, for example, a wired and a wireless local area network (LAN) connection interface device or the like. The input/output unit 101 in the respective example embodiments may accept input of an analysis model 20, end and interior wave data, a parameter to be modified, and the like from another system or the like that is not illustrated via the communication interface 1508.

A drive device 1507 is, for example, a device that processes reading and writing of data for a recording medium 1506 to be described below.

The recording medium 1506 is a recording medium that can record data such as an optical disc, a magneto-optical disc and a semiconductor flash memory.

An input/output interface 1510 is a device that controls input/output from/to an external device. A user of an analysis device may transmit, for example, information of a pipe network, designation of a range of analysis and an interior point, and wave data, various types of instructions, or the like to the analysis device via the input/output interface 1510, by using an input/output device (e.g. a keyboard, a mouse, a display device, a printer and the like) connected to the analysis device. Note that the input/output unit 101 in the respective example embodiments may be realized by using an input/output device connected to the input/output interface 1510.

In the respective example embodiments described above, an analysis device may be realized, for example, by the hardware device 1500 exemplarily illustrated in FIG. 12. Specifically, an analysis device may be realized by supplying a software program that can realize a function described in respective example embodiments to the hardware device 1500. In this case, the processing unit 1501 executes the software program supplied to the hardware device 1500, and thereby respective example embodiments may be realized.

In the respective example embodiments described above, the respective units illustrated in FIG. 1, FIG. 9, and FIG. 10 are a function (processing) unit of a software program to be executed by the above-described hardware and can be realized as a software module. However, division of respective software modules illustrated in these drawings is a configuration for convenience of description. Various configurations are assumable upon implementation of a software module.

When the respective units exemplarily illustrated in FIG. 1, FIG. 9, and FIG. 10 are realized as software modules, these software modules may be stored on the non-volatile storage device 1502. When executing respective processings, the processing unit 1501 may be configured to read these software modules onto the storage device 1503.

These software modules may be configured in such a way that various types of data can be mutually transmitted by an appropriate method such as a common memory and inter-process communication. These software modules are communicably connectable to one another by such a configuration.

The above-described software programs may be stored on the recording medium 1506. In a shipping stage, an operation stage or the like of the above-described communication device and the like, the software programs may be stored on the non-volatile storage device 1502 through the drive device 15, as appropriate.

In the case described above, as a method for supplying various types of software programs to the above-described analysis device, a method of installation into the device by using an appropriate tool in a production stage before shipping, a maintenance stage after shipping, or the like is employable. As a method for supplying various types of software programs, a common procedure such as a method of download from an outside via a communication line such as the Internet is currently employable.

In such a case, it is conceivable that an analysis device of respective example embodiments includes a computer readable storage medium recording codes that configure a software program.

The above-described analysis device or components of the analysis device may be realized by a virtualized environment in which the hardware device 1500 exemplarily illustrated in FIG. 12 is virtualized and various software programs (computer programs) to be executed in the virtualized environment. In this case, a component of the hardware device 1500 exemplarily illustrated in FIG. 12 is supplied as a virtual device in the virtualized environment. Also, in this case, an analysis device of respective example embodiments can be realized by a configuration similar to a case upon configuring the hardware device 1500 exemplarily illustrated in FIG. 12 as a physical device.

As described above, the present invention has been described as examples applied to the above-described example embodiments. However, the technical scope of the present invention is not limited to the scope described in the above-described example embodiments. It is clear to those skilled in the art that the above-described example embodiments can be subjected to various modifications or improvements. In such cases, new example embodiments added with modifications or improvements can be also included in the technical scope of the present invention. Example embodiments in which the above-described respective example embodiments or the new example embodiments added with modifications or improvements are combined can be also included in the technical scope of the present invention. This is clear from the matters according to CLAIMS.

This application is based upon and claims the benefit of priority from Japanese patent application No. 2016-098441, filed on May 17, 2016, the disclosure of which is incorporated herein in its entirety by reference.

A part or the whole of the exemplary embodiments can be described as the following supplementary notes, but not limited thereto.

<<Supplementary Notes>>

[Supplementary Note 1]

An analysis device comprising:

determination means for determining whether accuracy of a pipe network model based on information including a parameter changing in value depending on degradation of a pipe satisfies a predetermined condition; and derivation means for deriving information relating to degradation of the pipe based on the parameter when the accuracy satisfies the predetermined condition.

[Supplementary Note 2]

The analysis device according to supplementary note 1, further comprising modification means for modifying a value of the parameter when accuracy of the pipe network model does not satisfy the predetermined condition, wherein the modification means repeats the modification until the determination means determines that accuracy of the pipe network model reflected with the modification satisfies the predetermined condition.

[Supplementary Note 3]

The analysis device according to supplementary note 1 or 2, wherein the parameter is a parameter based on a sound velocity in fluid that flows in the pipe.

[Supplementary Note 4]

The analysis device according to any one of supplementary notes 1 to 3, wherein information relating to degradation of the pipe is information relating to a wall thickness of the pipe.

[Supplementary Note 5]

The analysis device according to any one of supplementary notes 1 to 4, wherein the derivation means outputs information indicating that the pipe is degraded when a value of the parameter does not satisfy predetermined criteria.

[Supplementary Note 6]

The analysis device according to supplementary note 5, wherein the predetermined criteria are criteria based on the parameter of the pipe network model that satisfied the predetermined condition in a past.

[Supplementary Note 7]

The analysis device according to any one of supplementary notes 1 to 6, wherein the determination means calculates accuracy of the pipe network model, based on a comparison between first transition characteristics being transition characteristics of a pressure at an interior point of the pipe that are derived from transition characteristics of a pressure at an end of the pipe, of fluid that flows in the pipe, and second transition characteristics input as transition characteristics of a pressure at the interior point of fluid that flows in the pipe.

[Supplementary Note 8]

An analysis method comprising:

determining whether accuracy of a pipe network model based on information including a parameter changing in value depending on degradation of a pipe satisfies a predetermined condition; and deriving information relating to degradation of the pipe based on the parameter when the accuracy satisfies the predetermined condition.

[Supplementary Note 9]

The analysis method according to supplementary note 8, further comprising modifying a value of the parameter when accuracy of the pipe network model does not satisfy the predetermined condition; and repeating the modification until accuracy of the pipe network model reflected with the modification satisfies the predetermined condition.

[Supplementary Note 10]

The analysis method according to supplementary note 8 or 9, wherein the parameter is a parameter based on a sound velocity in fluid that flows in the pipe.

[Supplementary Note 11]

The analysis method according to any one of supplementary notes 8 to 10, wherein information relating to degradation of the pipe is information relating to a wall thickness of the pipe.

[Supplementary Note 12]

The analysis method according to any one of supplementary notes 8 to 11, wherein outputting information indicating that the pipe is degraded when a value of the parameter does not satisfy predetermined criteria.

[Supplementary Note 13]

The analysis method according to supplementary note 12, wherein the predetermined criteria are criteria based on the parameter of the pipe network model that satisfied the predetermined condition in a past.

[Supplementary Note 14]

The analysis method according to any one of supplementary notes 8 to 13, wherein calculating accuracy of the pipe network model, based on a comparison between first transition characteristics being transition characteristics of a pressure at an interior point of the pipe that are derived from transition characteristics of a pressure at an end of the pipe, of fluid that flows in the pipe, and second transition characteristics input as transition characteristics of a pressure at the interior point of fluid that flows in the pipe.

[Supplementary Note 15]

A computer-readable recording medium on which a program is recorded, the program causing a computer to execute:

a determination process of determining whether accuracy of a pipe network model based on information including a parameter changing in value depending on degradation of a pipe satisfies a predetermined condition; and a derivation process of deriving information relating to degradation of the pipe based on the parameter when the accuracy satisfies the predetermined condition.

[Supplementary Note 16]

The recording medium according to supplementary note 15 on which a program is recorded, the program causing the computer to further execute a modification process of modifying a value of the parameter when accuracy of the pipe network model does not satisfy the predetermined condition, wherein the modification process repeats the modification until the determination process determines that accuracy of the pipe network model reflecting the modification satisfies the predetermined condition.

[Supplementary Note 17]

The recording medium according to supplementary note 15 or 16, wherein the parameter is a parameter based on a sound velocity in fluid that flows in the pipe.

[Supplementary Note 18]
The recording medium according to any one of supplementary notes 15 to 17, wherein
information relating to degradation of the pipe is information relating to a wall thickness of the pipe.

[Supplementary Note 19]
The recording medium according to any one of supplementary notes 15 to 18, wherein
the modification process outputs information indicating that the pipe is degraded when a value of the parameter does not satisfy predetermined criteria.

[Supplementary Note 20]
The recording medium according to supplementary note 19, wherein
the predetermined criteria are criteria based on the parameter of the pipe network model that satisfied the predetermined condition in a past.

[Supplementary Note 21]
The recording medium according to any one of supplementary notes 15 to 20, wherein
the determination process calculates accuracy of the pipe network model, based on a comparison between first transition characteristics being transition characteristics of a pressure at an interior point of the pipe that are derived from transition characteristics of a pressure at an end of the pipe, of fluid that flows in the pipe, and second transition characteristics input as transition characteristics of a pressure at the interior point of fluid that flows in the pipe.

REFERENCE SIGNS LIST 1-5 point in pipe network
10-12 analysis device
20 analysis model
101 input/output unit
102 transfer characteristics derivation unit
103 computation unit
105 wave comparison unit
106 determination unit
107 modification unit
108 derivation unit
301 pipe
302 electrical circuit
601 graph of input interior wave data
701 graph of computed interior wave data
702 graph of computed interior wave data
1500 hardware device
1501 processing unit
1502 non-volatile storage device
1503 storage device
1506 recording medium
1507 drive device
1508 communication interface
1509 communication network
1510 input/output interface
1511 bus

What is claimed is:

1. An analysis device comprising:
at least one memory storing a computer program; and
at least one processor configured to execute the computer program to
determine whether accuracy of a pipe network model based on information including a parameter changing in value depending on degradation of a pipe satisfies a predetermined condition, the parameter being a parameter based on a sound velocity in fluid that flows in the pipe; and
derive information relating to degradation of the pipe based on the parameter when the accuracy satisfies the predetermined condition.

2. The analysis device according to claim 1, wherein the processor is configured to execute the computer program to
modify a value of the parameter when accuracy of the pipe network model does not satisfy the predetermined condition; and
repeat the modification until determining that accuracy of the pipe network model reflected with the modification satisfies the predetermined condition.

3. The analysis device according to claim 1, wherein information relating to degradation of the pipe is information relating to a wall thickness of the pipe.

4. The analysis device according to claim 1, wherein the processor is configured to execute the computer program to
output information indicating that the pipe is degraded when a value of the parameter does not satisfy predetermined criteria.

5. The analysis device according to claim 4, wherein the predetermined criteria are criteria based on the parameter of the pipe network model that satisfied the predetermined condition in a past.

6. The analysis device according to claim 1, wherein the processor is configured to execute the computer program to
calculate accuracy of the pipe network model, based on a comparison between first transition characteristics being transition characteristics of a pressure at an interior point of the pipe that are derived from transition characteristics of a pressure at an end of the pipe, of fluid that flows in the pipe, and second transition characteristics input as transition characteristics of a pressure at the interior point of fluid that flows in the pipe.

7. An analysis method comprising:
determining whether accuracy of a pipe network model based on information including a parameter changing in value depending on degradation of a pipe satisfies a predetermined condition, the parameter being a parameter based on a sound velocity in fluid that flows in the pipe; and
deriving information relating to degradation of the pipe based on the parameter when the accuracy satisfies the predetermined condition.

8. The analysis method according to claim 7, further comprising
modifying a value of the parameter when accuracy of the pipe network model does not satisfy the predetermined condition; and
repeating the modification until accuracy of the pipe network model reflected with the modification satisfies the predetermined condition.

9. The analysis method according to claim 7, wherein information relating to degradation of the pipe is information relating to a wall thickness of the pipe.

10. The analysis method according to claim 7, wherein outputting information indicating that the pipe is degraded when a value of the parameter does not satisfy predetermined criteria.

11. The analysis method according to claim 10, wherein the predetermined criteria are criteria based on the parameter of the pipe network model that satisfied the predetermined condition in a past.

12. The analysis method according to claim 7, wherein calculating accuracy of the pipe network model, based on a comparison between first transition characteristics being transition characteristics of a pressure at an interior point of the pipe that are derived from transition characteristics of a pressure at an end of the pipe, of fluid that flows in the pipe, and second transition characteristics input as transition characteristics of a pressure at the interior point of fluid that flows in the pipe.

13. A computer-readable non-transitory recording medium on which a program is recorded, the program causing a computer to execute:

a determination process of determining whether accuracy of a pipe network model based on information including a parameter changing in value depending on degradation of a pipe satisfies a predetermined condition, the parameter being a parameter based on a sound velocity in fluid that flows in the pipe; and a derivation process of deriving information relating to degradation of the pipe based on the parameter when the accuracy satisfies the predetermined condition.

* * * * *